United States Patent
Zakonov et al.

(10) Patent No.: US 9,104,794 B2
(45) Date of Patent: Aug. 11, 2015

(54) AUTOMATIC INCREMENTAL APPLICATION DEPENDENCY DISCOVERY THROUGH CODE INSTRUMENTATION

(75) Inventors: Alex Zakonov, Manchester, CT (US); Victor Mushkatin, West Hartford, CT (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1218 days.

(21) Appl. No.: 12/503,321

(22) Filed: Jul. 15, 2009

(65) Prior Publication Data

US 2010/0037211 A1 Feb. 11, 2010

Related U.S. Application Data

(60) Provisional application No. 61/134,900, filed on Jul. 15, 2008.

(51) Int. Cl.
G06F 9/44 (2006.01)
G06F 11/36 (2006.01)

(52) U.S. Cl.
CPC .................. G06F 11/3604 (2013.01)

(58) Field of Classification Search
None
See application file for complete search history.

(56) References Cited

U.S. PATENT DOCUMENTS

| | | | |
|---|---|---|---|
| 5,687,182 A | 11/1997 | Shikakura | |
| 6,467,052 B1 | 10/2002 | Kaler et al. | |
| 6,537,228 B1 | 3/2003 | Lambert | |
| 6,714,976 B1 | 3/2004 | Wilson et al. | |
| 7,137,112 B2 * | 11/2006 | Lovvik et al. | 717/166 |
| 7,224,686 B1 | 5/2007 | Doskow et al. | |
| 7,536,680 B2 * | 5/2009 | Berry et al. | 717/130 |
| 7,539,974 B2 | 5/2009 | Beck et al. | |
| 7,590,715 B1 * | 9/2009 | Raanan | 709/223 |
| 7,614,040 B2 * | 11/2009 | Wagner et al. | 717/120 |
| 2002/0087949 A1 | 7/2002 | Golender et al. | |
| 2002/0198976 A1 | 12/2002 | Davenport | |
| 2003/0110253 A1 | 6/2003 | Anuszczyk et al. | |
| 2003/0195997 A1 | 10/2003 | Ibert et al. | |
| 2004/0046785 A1 | 3/2004 | Keller | |
| 2004/0049509 A1 | 3/2004 | Keller et al. | |
| 2004/0243981 A1 | 12/2004 | Luk et al. | |
| 2004/0250261 A1 | 12/2004 | Huibregtse | |

(Continued)

*Primary Examiner* — Henry Tsai
*Assistant Examiner* — Juanito Borromeo
(74) *Attorney, Agent, or Firm* — Brian Haslam; Aaron Hoff; Micky Minhas

(57) ABSTRACT

Disclosed is a method allowing the automatic discovery of application component dependencies by tracing application calls to dependant resources. The call tracing is embedded dynamically in an application at runtime using Common Intermediate Language ("CIL") code instrumentation at compile time or runtime. Such a method reads an instrumentation configuration file to determine an address extraction code portion that is to be instrumented to an application method code, locates the CIL method body for the application method that is to be instrumented, instruments the application method by inserting the address extraction code portion into the appropriate .NET Application or .NET library at either compile time or at run time, extracts the address of one or more external service providers from the designated .NET library methods responsible for communication during execution of the application method that was instrumented, publishes any newly discovered dependencies to a management system in the form of the discovery event, and causes the management system to build an application dependency map based on the resource address information obtained.

20 Claims, 3 Drawing Sheets

(56) References Cited

U.S. PATENT DOCUMENTS

| | | |
|---|---|---|
| 2004/0255272 A1 | 12/2004 | Ondrusek et al. |
| 2004/0268302 A1 | 12/2004 | Srivastava et al. |
| 2004/0268308 A1 | 12/2004 | Srivastava et al. |
| 2005/0033766 A1 | 2/2005 | Pang et al. |
| 2005/0114494 A1 | 5/2005 | Beck et al. |
| 2005/0114848 A1 | 5/2005 | Choi et al. |
| 2005/0138111 A1 | 6/2005 | Aton et al. |
| 2005/0155019 A1 | 7/2005 | Levine et al. |
| 2005/0155026 A1 | 7/2005 | DeWitt, Jr. et al. |
| 2005/0172306 A1 | 8/2005 | Agarwal et al. |
| 2005/0210454 A1 | 9/2005 | DeWitt, Jr. et al. |
| 2006/0059474 A1 | 3/2006 | Bhansali et al. |
| 2006/0112370 A1 | 5/2006 | Irving et al. |
| 2006/0150200 A1 | 7/2006 | Cohen et al. |
| 2006/0242627 A1 | 10/2006 | Wygodny et al. |
| 2007/0038974 A1 | 2/2007 | Albahari et al. |
| 2007/0074074 A1 | 3/2007 | Curtis et al. |
| 2007/0074150 A1 | 3/2007 | Jolfaei et al. |
| 2007/0094281 A1 | 4/2007 | Malloy et al. |
| 2007/0118336 A1 | 5/2007 | Parikh et al. |
| 2007/0261033 A1 | 11/2007 | Chen et al. |
| 2008/0114806 A1 | 5/2008 | Kosche |
| 2008/0167977 A1 | 7/2008 | Auvenshine et al. |
| 2008/0177756 A1 | 7/2008 | Kosche et al. |
| 2008/0184209 A1 | 7/2008 | LaFrance-Linden |
| 2008/0189687 A1 | 8/2008 | Levine et al. |
| 2008/0209005 A1 | 8/2008 | Akamatsu et al. |
| 2008/0209397 A1 | 8/2008 | Mohindra et al. |
| 2008/0229028 A1 | 9/2008 | Cascaval et al. |
| 2008/0270515 A1 | 10/2008 | Chen et al. |
| 2008/0307396 A1 | 12/2008 | Broman et al. |
| 2008/0313618 A1 | 12/2008 | Broman et al. |
| 2008/0317217 A1 | 12/2008 | Bernardini et al. |
| 2009/0089670 A1 | 4/2009 | Gooding et al. |
| 2009/0112559 A1 | 4/2009 | Christensen et al. |
| 2009/0138858 A1 | 5/2009 | Livshits et al. |

* cited by examiner

AUTOMATIC INCREMENTAL APPLICATION DEPENDENCY DISCOVERY THROUGH CODE INSTRUMENTATION

CROSS REFERENCE TO RELATED APPLICATIONS

This application is based upon and claims benefit of copending U.S. Provisional Patent Application Ser. No. 61/134,900 entitled "Automatic Incremental Application Dependency Discovery Through MSIL Code Instrumentation", filed with the U.S. Patent and Trademark Office on Jul. 15, 2008 by the inventors herein, the specification of which is incorporated herein by reference.

FIELD OF THE INVENTION

This invention relates generally to application dependency discovery, and more particularly to incremental dependency discovery using application instrumentation.

DESCRIPTION OF THE BACKGROUND

In many organizations, operations teams are charged with management and support of applications without getting clear information about the application topology and infrastructure provided by the application development team. It makes application management, change control, and impact analysis tedious and sometimes impossible. In those scenarios, the application is like an unpredictable and unstructured black box for operations.

For effective change control and impact analysis, the operations team has to discover application dependencies and analyze how a change to one component may affect other dependent components. Today, the only way to discover dependencies is to get a blue print from the application development team that describes the application architecture. After that, the blue print needs to be updated every time a new version of the application is deployed. That process is labor intensive and error prone.

The difficulty in comprehending application dependencies becomes even more complex when dealing with distributed applications, which are typically characterized by components running on several different machines, written in different languages, and interacting in complex ways. For instance, modern Enterprise .NET applications have a distributed architecture and may consist of a number of components talking to each other via various communication protocols. In some cases, they also rely on external service providers. Communication with external service providers is typically performed using Web Services. If we consider a single application component, it may have a number of dependencies on internal service providers that correspond to other components of the distributed application and on external service providers that may be outside of the boundary of the distributed application. A misbehavior or a change in any of the service providers may affect the functionally or availability of the application component.

It would therefore be advantageous to provide techniques by which application dependencies existent in distributed applications could be discovered, regardless of the manner in which the distributed application was developed, and particularly regardless of whether the separate application components are developed in different languages, or run on multiple machines, or interact in complex ways.

SUMMARY OF THE INVENTION

In accordance with one particularly preferred embodiment, an exemplary method allows automatic discovery of application component dependencies by tracing application calls to dependant resources. The call tracing is embedded dynamically in an application at runtime using Common Intermediate Language ("CIL") (formerly referred to as Microsoft Intermediate Language, or "MSIL") code instrumentation at compile time or runtime. Such a method reads an instrumentation configuration file to determine methods that need to be instrumented, locates the CIL method body for the application method that is to be instrumented, instruments the application method by inserting an address extraction code portion into the appropriate .NET Application or .NET library at either compile time or at run time, extracts the address of one or more external service providers from the designated .NET library methods responsible for communication during execution of the application method that was instrumented, publishes any newly discovered dependencies to a management system in the form of the discovery event, and causes the management system to build an application dependency map based on the resource address information obtained.

DESCRIPTION OF THE DRAWINGS

The above and other features, aspects, and advantages of the present invention are considered in more detail, in relation to the following description of embodiments thereof shown in the accompanying drawings, in which.

DETAILED DESCRIPTION OF THE PREFERRED EMBODIMENT

The invention summarized above may be better understood by referring to the following description, which should be read in conjunction with the accompanying drawings in which like reference numbers are used for like parts. This description of an embodiment, set out below to enable one to practice an implementation of the invention, is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Disclosed herein are methods by which dependencies existing among disparate .NET application components may be automatically discovered, regardless of the extent to which those components are separated in a distributed architecture, by using application instrumentation to trace application calls to dependent resources. As used herein, an application is "instrumented" by inserting code that extracts the address of external service providers called by a particular application at compile time or runtime. This code insertion process is referred to as "instrumenting" as it provides "instruments" for monitoring distributed applications, and more particularly for determining dependencies among separate components of distributed applications, so as to allow an administrator to effectively manage change control and impact analysis.

Figure 1:
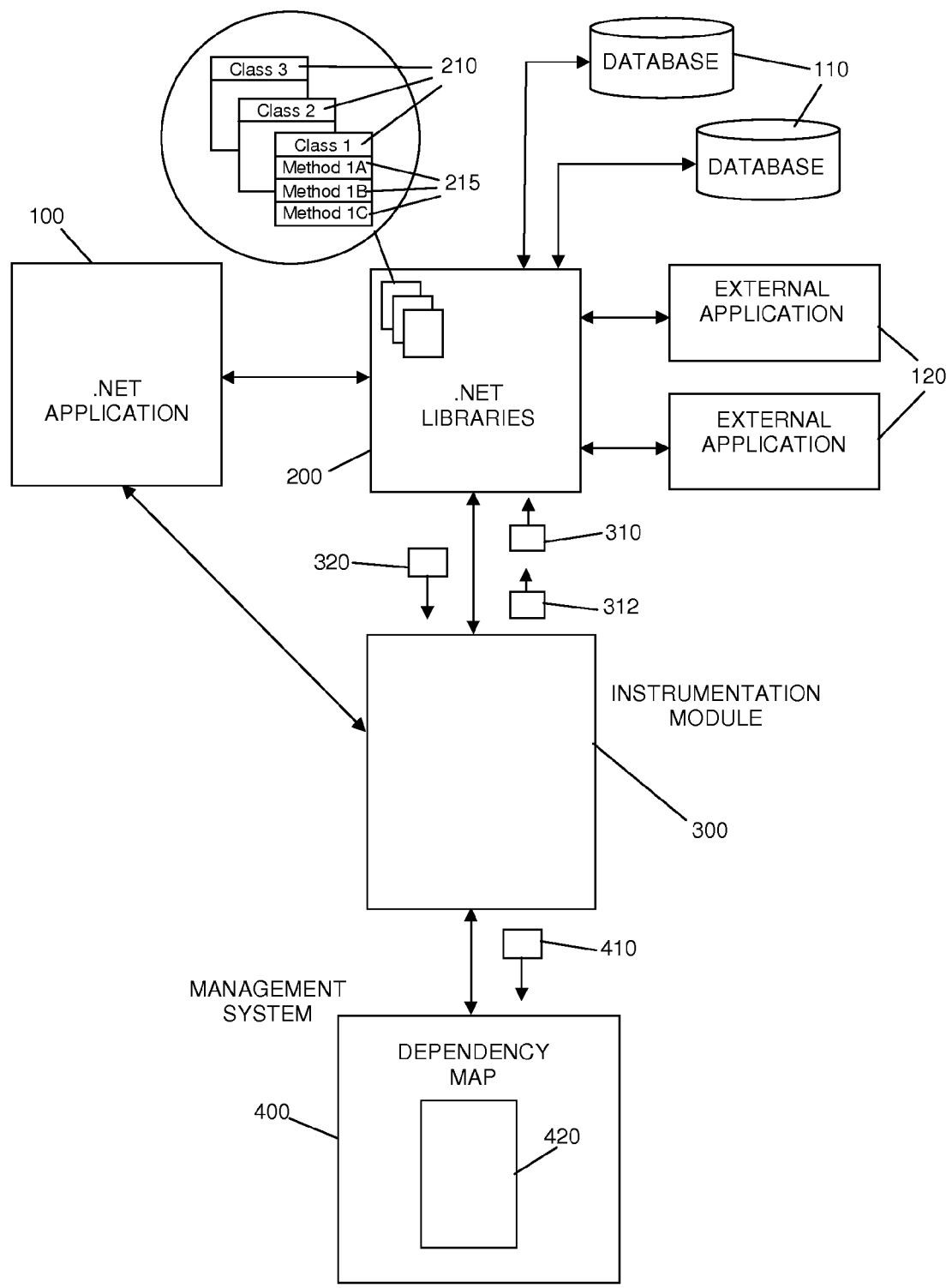
FIG. 1 is a schematic view of a distributed application environment according to one aspect of a particularly preferred embodiment of the invention.

FIG. 1 provides a schematic view of an exemplary distributed application environment. Components of a .NET application 100 may use .NET libraries 200 to talk to external service providers, such as external databases 110, external application service components 120, or other distributed components of a particular .NET application. By way of non-limiting example, for communicating with databases 110, .NET application 100 may use the SqlClient library, Oracle library, IBM Db2 library, ODBC library, OLEDb library, and others. For communicating with external application service components 120, and again by way of non-limiting example, .NET application 100 may use a Web Service library, Windows Communication Foundation (WCF) library, and .NET Remoting, in addition to other similarly configured libraries. In addition to using .NET libraries, a .NET application may communicate with external service providers directly without using a library. In that case, the code that is responsible for communication with an external service provider will be part of the .NET application code itself. That scenario is typically used when an application needs to communicate with a custom external service provider over a non-standard protocol. In each case, a .NET Application 100 and the .NET libraries 200 are implemented as .NET code with classes 210, which classes 210 include methods 215 for executing requests against a corresponding service provider, such as databases 110 and external application service components 120.

.NET applications that rely on communication libraries, such as those depicted in FIG. 1 at 200, typically reference compiled versions of those libraries. Such .NET libraries are compiled into an intermediate language called Common Intermediate Language, or "CIL." CIL preserves the overall application structure. During the compilation process, application classes and methods in an application source code are converted into corresponding classes and methods in CIL code. During application execution, the Common Language Runtime (CLR) converts CIL code to machine code and executes the instructions in the code. Conversion of an application method to the machine code is done before the first execution of the method.

With regard to a first particularly preferred aspect of the invention, an instrumentation module 300 is in communication with .NET libraries 200 and .NET Application 100, such that instrumentation module 300 may instrument methods 215 that are responsible for connecting .NET application 100 to or communicating it with distributed service providers. As discussed in greater detail below, the instrumentation code that the instrumentation module 300 inserts into methods 215 comprises extraction code 310, which extracts the address 320 of an external service provider from particular parameters or member variables of library methods 215 that are responsible for the communication between .NET application 100 and such external service providers. After the external service provider address 320 is extracted from the respective library or application method 215, the instrumentation module 300 compares the extracted external service provider address 320 with a list of previously discovered dependencies, and determines whether the stated dependency has previously been discovered. After such analysis, the instrumentation module 300 publishes any extracted new dependency information to a management system 400 in the form of a discovery event 410. The management system subscribes on the discovery events 410 published by instrumentation module 300, collects them, and based on the external resource address information builds an application dependency map 420, which in turn may be used by a manager, administrator, programmer, or other user of the .NET application to evaluate and understand the dependency relationships between the .NET application and its various external, distributed components and services.

In order to instrument the code, instrumentation module 300 must have information about what methods are responsible for communication with external service providers and need to be instrumented, how to instrument those methods, and how to extract external service provider address 320 from instrumented method parameters and member variables. This information can be hardcoded in the instrumentation module 300 or placed in one configuration file or several configuration files. Placing this information in the configuration files allows adjusting the instrumentation without changing the instrumentation module 300 itself.

The list of methods to instrument is defined by the list of communication protocols for which the dependency discovery needs to be supported. For each supported communication protocol, the instrumentation configuration contains a list of methods from .NET application 100 or a communication library 200 that are responsible for connecting to or executing requests for an external service provider. The list of methods is identified manually by analyzing source code or CIL code for .NET application 100 or a communication library 200 and selecting the methods that connect to or execute a request for an external service provider. In order to connect to or to execute a request for an external service provider, a method that is responsible for communications must have an address of that external service provider. For instance, in the case of database providers 110, the address is typically presented in the form of a connection string. Further, in the case of application-to-application communications, address information is typically presented in a form of a Uniform Resource Identifier (URI). The address is typically accessible thought parameters or member variables of a method responsible for the communication. For each communication method, the instrumentation configuration contains an extraction rule definition that contains information on how to access the external service provider address from the instrumented method parameters or member variables. The address information can be stored in one of multiple member variables or parameters. If a member variable is an object, the address information may be stored in one of the member variables or properties of this object. Address information may be represented by a complete member variable or parameter value, or by a part of the value. The extraction rule definition contains information about what parameters or member variables contain address information and how to extract the address from the values of those parameters or member variables. The extraction rule definition defines extraction code 310 that will be used for reading the address. The extraction code 310 can access member variable or parameters values directly or through using .NET reflection. The direct access requires a compile time dependency on a communication library, or a .NET application that contains an instrumented method. .NET reflection is a mechanism that allows reading values based on their names without compile time dependency. If extraction code 310 reads values directly, then unique extraction code needs to be created for each instrumented method. If extraction code 310 uses .NET reflection to read values, then common extraction code can be used for instrumenting different methods. The common extraction code relies on a declarative definition in the instrumentation configuration to identify names of member variables or parameters that need to be read to extract the address. A declarative approach for extraction code offers more flexibility and allows expanding the list of supported communication protocols without creating custom extraction code for each new protocol. The drawback of using declarative methods, however, is relatively slow performance. Reading a value using .NET reflection is significantly slower than reading a value directly. As a result, direct access extraction rules will typically offer better performance. Because extraction occurs during application execution, performance is an important feature, thus providing a potential preference for the use of direct access extraction rules.

Figure 2:
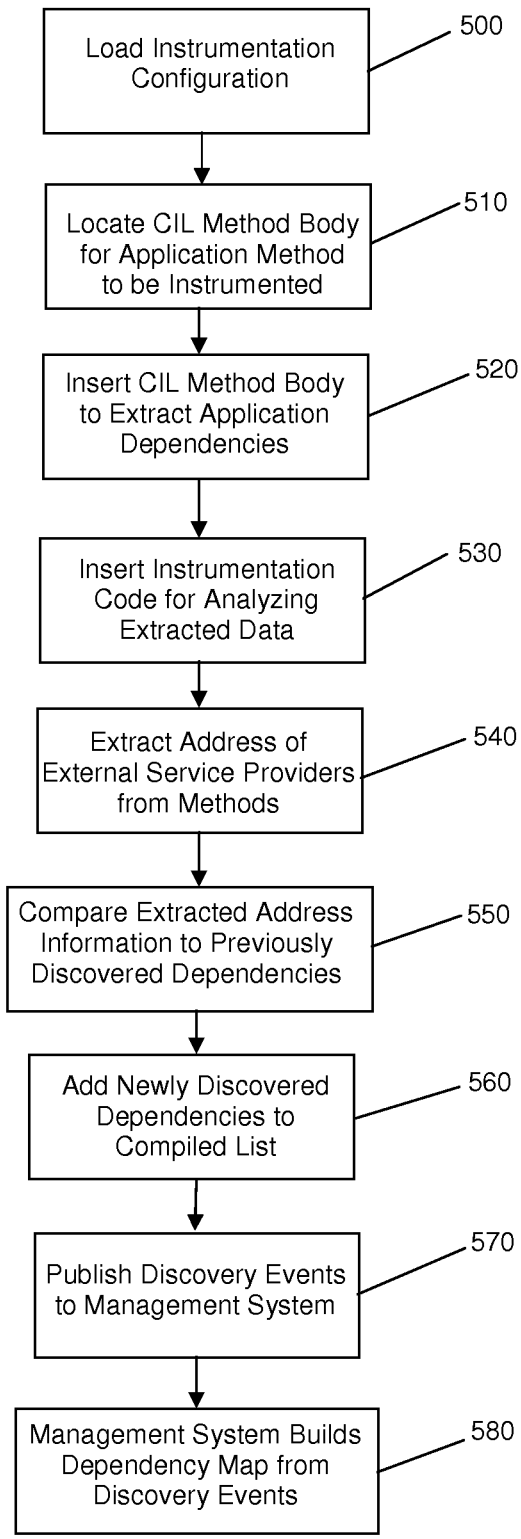
FIG. 2 is a schematic view of an exemplary method according to another aspect of a particularly preferred embodiment of the invention.

FIG. 2 is a schematic view of an exemplary method that may be carried out by instrumentation module 300 of FIG. 1 to instrument CIL method code in order to discover dependencies among distributed components of a .NET application. At a first step 500, instrumentation module 300 loads the instrumentation configuration. The instrumentation configuration can be loaded from one or more configuration files or hardcoded directly in the instrumentation module 300. The instrumentation configuration contains a list of classes and methods that need to be instrumented and an extraction rules definition for each instrumented method. From the instrumentation configuration, instrumentation module 300 looks up the list of classes 210 and methods 215 that need to be instrumented, and likewise locates information about the extraction rule definition for each method. Based on the particular classes and methods that are to be instrumented, instrumentation module 300 consults the extraction rules definition in the instrumentation configuration to determine the particular extraction code 310 that is to be inserted into the particular method being instrumented.

Next, at step 510, and based on the method name, instrumentation module 300 locates the particular CIL method body for the application method 215 that needs to be instrumented. At step 520, instrumentation module 300 inserts the extraction code 310 in the method body to extract information about application dependencies. In accordance with a particularly preferred embodiment of the invention, step 510 and step 520 may be carried out either at compile time or at run time. The decision to do the instrumentation at compile or runtime is based on the usage scenarios. Compile time instrumentation allows instrumentation to be carried out only once during the compile time, but after that instrumentation is fixed. Runtime time instrumentation requires executing instrumentation during each application load. Runtime time instrumentation is more flexible but requires access to the application runtime environment and creates extra overhead during the application load process. If the instrumentation is to be carried out at compile time, the instrumentation module 300 reads metadata for an assembly file for the .NET application 100 or communication library 200 that contains a method being instrumented. The metadata contains a list of classes and methods defined in the assembly combined with information about method body location within the assembly. The instrumentation module 300 looks up the method body address based on the method name from the list of methods in the assembly metadata and retrieves the method body Alternatively, if the instrumentation is to be carried out at run time, instrumentation module 300 subscribes on Just in Time (JIT) compilation callbacks of the .NET profiling API. The JIT compilation callback passes function ID to the instrumentation module 300. The function ID uniquely identifies a function within an application or library. Based on the function ID received from the JIT callbacks, the instrumentation module 300 calls the profiling API and retrieves the method body for the method 215 being instrumented. The instrumentation module 300 modifies the method body by adding the extraction code 310 to the method body. The extraction code 310 can be inserted directly into the method body or the extraction code 310 can be kept as a separate extraction method, in which case a call to the extraction method is inserted into the method body.

After adding the extraction code 310 to the method 215, at step 530 instrumentation module 300 modifies method body for method 215 by adding additional analysis code 312 for analyzing the extracted data. The analysis code 312 contains logic to compare the address value extracted by the extraction code 310 with a list of addresses for previously discovered dependencies. After the particular method or methods 215 have been instrumented with both the extraction code 310 and the analysis code 312, at step 540, and when the instrumented .NET application executes, the extraction code 310 extracts the address of one or more external service providers from library methods 215 that have been instrumented as discussed above.

After the address information has been extracted, at step 550 the analysis code 312 compares the extracted address information with a list of previously discovered dependencies to determine whether a dependency already exists. If a dependency already exists in the list of discovered dependencies, the newly obtained address information is discarded. If, however, a dependency does not already exist in the list of previously discovered dependencies, then the newly obtained address information is added to the list of discovered dependencies at step 560.

In addition to adding the newly obtained address information to the list of discovered dependencies, instrumentation module 300 at step 570 also publishes any such newly discovered dependencies to management system 400 in the form of a discovery event 410, which contains information about the distributed application component and information about the detected dependency. The discover event 410 may be published, by way of non-limiting example, via WMI, SNMP, or any other eventing mechanisms as will be apparent to those of ordinary skill in the art. The format of the discovery event is based upon the particular eventing mechanism used. Management system 400 preferably subscribes on the discovery events 410, collects them, and at step 580 builds an application dependency map 420. To build the application dependency map, the management system 400 reads information about the distributed application component and discovered dependency component for the discovery event, and checks if those components already exist in the dependency map. If either components or one of them does not exist in the dependency map, the management system 400 adds the corresponding component or components to the list of components in the dependency map. Next, the management system 400 verifies if a dependency between the distributed application component and the discovered dependency component already exists in the dependency map. If the relation does not exist, the management system 400 adds the dependency to the map.

Figure 3:
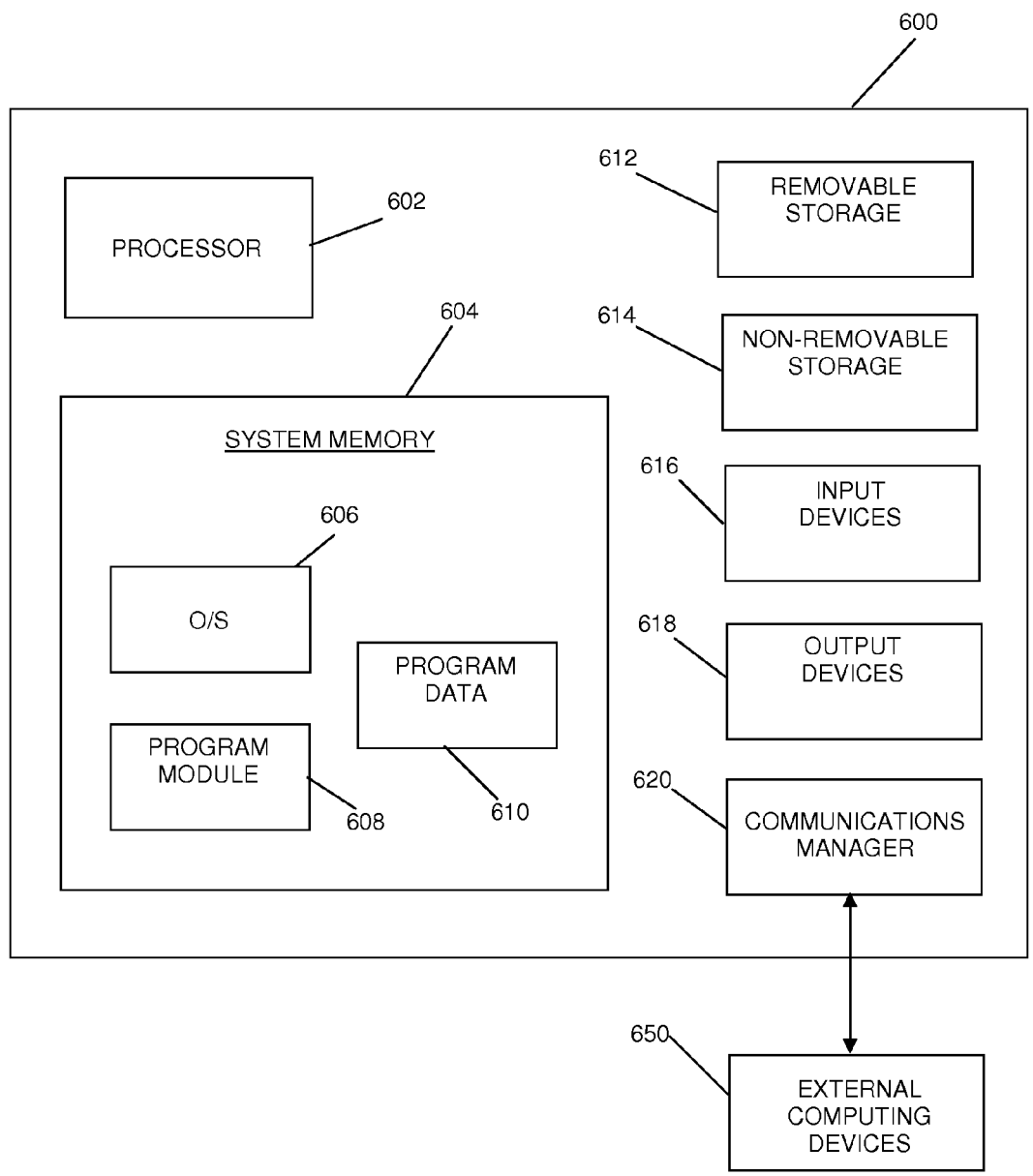
FIG. 3 is a block diagram of an exemplary computing device for use with the distributed application environment of FIG. 1 and the method of FIG. 2.

Instrumentation module 300 and the method depicted in FIG. 2 may be implemented on a computer system, an exemplary embodiment of which is shown in FIG. 3. A computing device 600 may include at least one processor 602 and system memory 604. System memory may be volatile (such as RAM), non-volatile (such as ROM, flash memory, etc.), or some combination of the two. System memory 604 may include an operating system 606, one or more program modules 608, and program data 610. Operating system 606 may include a component-based framework that supports components, objects, inheritance, polymorphism, and reflection, and may provide an object-oriented component-based application programming interface (API), such as that of the .NET™ Framework manufactured by Microsoft Corporation, Redmond, Wash. Computing device 600 may also include additional removable data storage devices 612 and non-removable data storage devices 614, such as, by way of non-limiting example, magnetic disks, optical disks, or tape. Such computer storage media may include volatile and non-volatile, removable and non-removable media implemented in any method or technology for storage of information, such as computer readable instructions, data structures, program modules, or other data. Each of system memory 604, removable storage 612, and non-removable storage 614 may include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be accessed by computing device 600. Computing device 600 may also include one or more input devices 616, such as a keyboard, mouse, pen, voice input device, touch input device, etc., one or more output devices 618, such as a display, printer, speakers, etc., and such other devices as may be particularly suited to a specific application as will be evident to those of ordinary skill in the art. Moreover, computing device 600 may also include a communications manager 620 allowing communication between computing device 600 and other, external computing devices 650, such as over a computer network. Communications manager 620 may be implemented through computer readable instructions, data structures, program modules, or other data in a modulated data signal (i.e., a signal that has one or more of its characteristics set or changed in such a manner as to encode information in the signal), such as a carrier wave or other transport mechanism, and includes any information delivery media, and may include wired media such as a wired network or direct-wired connection, and wireless media such as acoustic, RF, infrared and other wireless media.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

The invention claimed is:

1. A computer implemented method for automatically mapping application dependencies in a distributed application, comprising:
    loading an instrumentation configuration file which identifies one or more computer programs which implement methods requiring code instrumentation in order to provide automatic mapping of application dependencies, the configuration file comprising an extraction rule defining how to access an address from an instrumented method;
    locating an intermediate language method body from which address information can be extracted from the one or more computer programs, the address information comprising an electronic address of external service providers to the one or more computer programs;
    determining an instruction from the extraction rule in the configuration file, the instruction to be inserted into the one or more computer programs for extracting the address information from the one or more computer programs;
    inserting the instruction into the one or more computer programs;
    extracting the address information from the one or more computer programs by executing the inserted instruction;
    inserting analysis code into the one or more computer programs, wherein the analysis code comprises executable computer instructions for comparing an address value extracted by the instruction with a list of address for previously discovered application dependencies;
    comparing extracted address information with a list of previously discovered dependencies to determine whether a dependency already exists; and
    using the extracted address information to build an application dependency map.

2. The method of claim 1, wherein said reading step further comprises:
    identifying at least one of an application class and an application method that is to be instrumented; and
    determining an address extraction code that is to be inserted into the method being instrumented.

3. The method of claim 1, wherein said inserting step further comprises inserting a call to said intermediate language method body.

4. The method of claim 1, wherein said inserting step further comprises inserting said intermediate language method body into said one or more computer programs.

5. The method of claim 1, wherein said reading step and said locating step are carried out at a time of compiling said one or more computer programs.

6. The method of claim 5, further comprising the step of reading metadata for an assembly file for said one or more computer programs to determine a location of method body code within the assembly that is to be instrumented.

7. The method of claim 1, wherein said reading step and said locating step are carried out at a time of running said one or more computer programs.

8. The method of claim 1, further comprising the step of discarding newly obtained address information if said comparing step determines that a dependency already exists.

9. The method of claim 1, further comprising the step of adding newly obtained address information to a list of discovered dependencies if said comparing step determines that a dependency does not already exist.

10. A computer program product for implementing a computer implemented method for automatically mapping application dependencies in a distributed application, the computer program product comprising one or more computer hardware data storage devices having encoded thereon computer-executable instructions which, when executed on one or more computer processors, performs the method comprising:
    loading an instrumentation configuration file which identifies one or more computer programs which implement methods requiring code instrumentation in order to provide automatic mapping of application dependencies, the configuration file comprising an extraction rule defining how to access an address from an instrumented method;
    locating an intermediate language method body from which address information can be extracted from the one or more computer programs, the address information comprising an electronic address of external service providers to the one or more computer programs;
    determining an instruction from the extraction rule in the configuration file, the instruction to be inserted into the one or more computer programs for extracting the address information from the one or more computer programs;

inserting the instruction into the one or more computer programs;

extracting the address information from the one or more computer programs by executing the inserted instruction;

inserting analysis code into the one or more computer programs, wherein the analysis code comprises executable computer instructions for comparing an address value extracted by the instruction with a list of address for previously discovered application dependencies;

comparing extracted address information with a list of previously discovered dependencies to determine whether a dependency already exists; and using the extracted address information to build an application dependency map.

11. The computer program product of claim 10, wherein said reading step further comprises:

identifying at least one of an application class and an application method that is to be instrumented; and determining an address extraction code that is to be inserted into the method being instrumented.

12. The computer program product of claim 10, wherein said inserting step further comprises inserting a call to said intermediate language method body.

13. The computer program product of claim 10, wherein said inserting step further comprises inserting said intermediate language method body into said one or more computer programs.

14. The computer program product of claim 10, wherein said reading step and said locating step are carried out at a time of compiling said one or more computer programs.

15. The computer program product of claim 14, further comprising the step of reading metadata for an assembly file for said one or more computer programs to determine a location of method body code within the assembly that is to be instrumented.

16. A system for implementing a computer implemented method for automatically mapping application dependencies in a distributed application, the system comprising one or more computer processors and one or more computer storage devices having encoded thereon computer-executable instructions which, when executed on the one or more computer processors, performs the method comprising:

loading an instrumentation configuration file which identifies one or more computer programs which implement methods requiring code instrumentation in order to provide automatic mapping of application dependencies, the configuration file comprising an extraction rule defining how to access an address from an instrumented method;

locating an intermediate language method body from which address information can be extracted from the one or more computer programs, the address information comprising an electronic address of external service providers to the one or more computer programs;

determining an instruction from the extraction rule in the configuration file, the instruction to be inserted into the one or more computer programs for extracting the address information from the one or more computer programs;

inserting the instruction into the one or more computer programs;

extracting the address information from the one or more computer programs by executing the inserted instruction;

inserting analysis code into the one or more computer programs, wherein the analysis code comprises executable computer instructions for comparing an address value extracted by the instruction with a list of address for previously discovered application dependencies;

comparing extracted address information with a list of previously discovered dependencies to determine whether a dependency already exists; and using the extracted address information to build an application dependency map.

17. The system of claim 16, wherein said reading step further comprises:

identifying at least one of an application class and an application method that is to be instrumented; and determining an address extraction code that is to be inserted into the method being instrumented.

18. The system of claim 16, wherein said inserting step further comprises inserting a call to said intermediate language method body.

19. The system of claim 16, wherein said inserting step further comprises inserting said intermediate language method body into said one or more computer programs.

20. The system of claim 16, wherein said reading step and said locating step are carried out at a time of compiling said one or more computer programs.

* * * * *